C. BOUILLON.
APPARATUS FOR SEPARATING SOLIDS FROM LIQUIDS.
APPLICATION FILED FEB. 21, 1922.

1,429,320.

Patented Sept. 19, 1922.
2 SHEETS—SHEET 1.

INVENTOR
Charles Bouillon
BY Townsend & Decker
ATTORNEYS

C. BOUILLON.
APPARATUS FOR SEPARATING SOLIDS FROM LIQUIDS.
APPLICATION FILED FEB. 21, 1922.

Patented Sept. 19, 1922.

INVENTOR
Charles Bouillon
BY
Townsend + Weeker
ATTORNEYS

Patented Sept. 19, 1922.

1,429,320

UNITED STATES PATENT OFFICE.

CHARLES BOUILLON, OF PARIS, FRANCE.

APPARATUS FOR SEPARATING SOLIDS FROM LIQUIDS.

Application filed February 21, 1922. Serial No. 538,344.

*To all whom it may concern:*

Be it known that I, CHARLES BOUILLON, residing at 25 Rue de la Pépinière, Paris, France, have invented certain new and useful Improvements in Apparatus for Separating Solids from Liquids, of which the following is a specification.

Centrifugal force has long been employed for separating solid matter held in suspension in liquids whose separation by filtration would be difficult to effect by reason of the fineness of the particles to be retained or of their colloidal nature.

This invention has for its object apparatus for continuously separating solids from liquids which allows manual work to be substantially reduced, while the motive power and the supervision of the operations is economized.

In this apparatus the liquid to be clarified is continuously introduced at the periphery of a cylindrical or other container and at the base of a certain number of juxtaposed containers of pyramidal, conical or similar shape which form an outwardly extending prolongation of the said cylindrical container, while fluid continuously passes out at the axis of the apparatus owing to the fact that the quantity of liquid to be clarified is always introduced into the apparatus in excess of that which can pass out at the periphery of the apparatus; suitable means may be provided for regulating the quantity of liquid passing out at the periphery. As the enriched liquid must possess a certain minimum fluidity it may happen that it takes with it a more or less substantial quantity of the liquid of the same nature as the clarified liquid. A loss in clarified liquid thus results which might be considerable if the initial liquid is rich in solids.

According to this invention the enriched liquid is given the requisite fluidity by leading water or other suitable diluent into the apparatus whereby the initial liquid after clarification may be obtained without loss.

Figure 1:
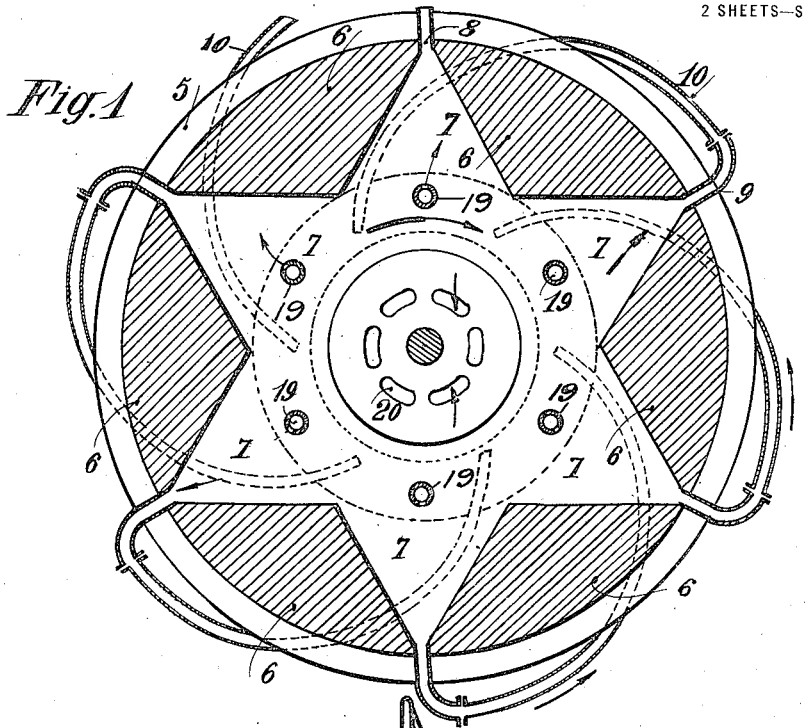
Figure 2:
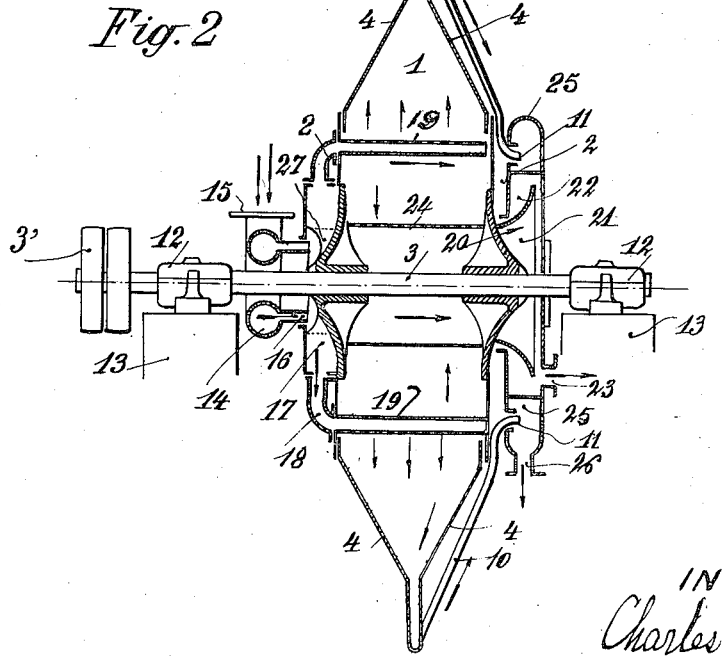

The invention is illustrated in the accompanying drawings in which Figure 1 is a diametral section of one form of apparatus and Figure 2 is a vertical section taken through the axis of rotation.

Figure 3:
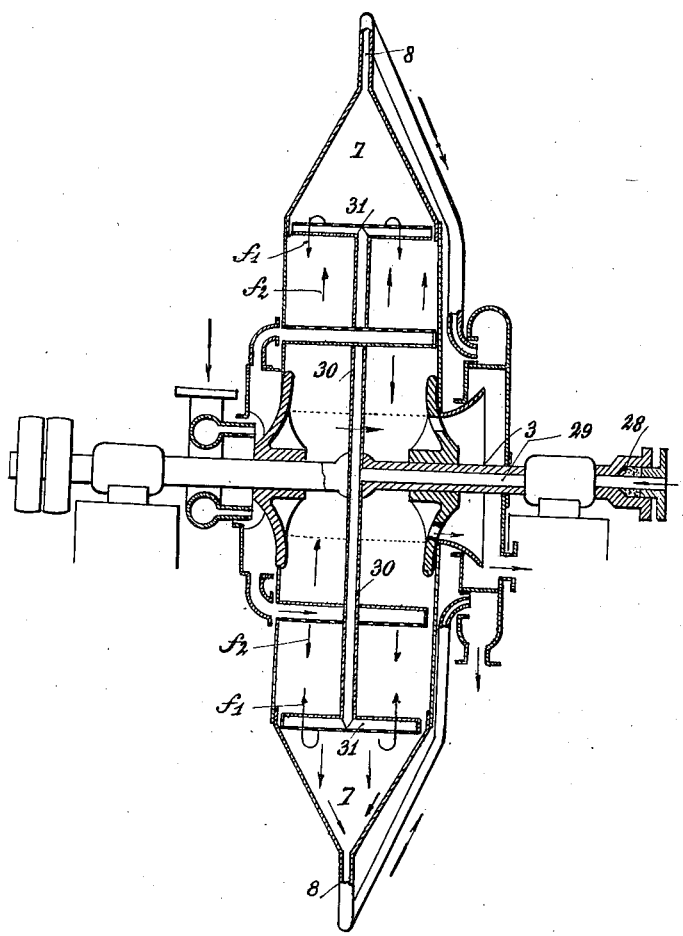

Figure 3 is a view similar to that shown in Figure 1 of apparatus in which means are also provided for the inlet of a diluent.

In the apparatus as illustrated the axle is arranged horizontally but it may be vertical, the details being correspondingly changed.

1 is a cylindrical container formed of two circular disks 2 keyed upon the axle 3 and connected together by two conical frusta 4 whose axes coincide with those of the circular disks 2; the larger bases of the frusta 4 are assembled to form a circle 5.

In the inner space thus formed, which has the shape of two conical frusta connected by their large bases, are arranged a series of equally spaced solids 6 of the same pyramidal shape, the spaces 7 between the solids all having the shape of a pyramid whose vertices are arranged on the circle 5.

At the vertex 8 of each of the pyramidal spaces thus formed are arranged tubes 9 of which the prolongations 10 are curved inwards towards the centre of the apparatus; all the ends of the prolongations 10 are brought parallel to the axle of the machine and terminate in conical reducing nozzles 11 of a definite size; the nozzles are made easily removable and may be replaced by other nozzles in order to vary the delivery from the pipe 10.

The axle 3 of the apparatus is carried by two bearings 12 mounted on supports 13. On the axle is keyed a driving pulley 3'.

A fixed circular distributor 14 receiving liquid to be filtered through a pipe 15 distributes it through a series of nozzles 16 into a circular casing 17 fixed to the disk 2 and turning with it. 18 is a series of tubes leading liquid to be filtered from the casing 17 without shock to tubes 19 which pass through apparatus and are arranged parallel to its axle; the tubes 19 are perforated outwardly in order to cause the equal distribution of the liquid.

20 is a series of equally distributed apertures arranged in a circle through which clarified liquid leaves the apparatus to pass into a circular conduit 21 and from thence into the fixed circular collector 22, from there out through the tube 23. A perforated tube 24 concentric with the axle and arranged at the level of the outlet apertures 20 renders uniform the flow of the liquid which is to pass out of the apparatus.

25 is a fixed circular collector concentric with and outside of the collector 22 and which receives fluid passing out from each nozzle 11 and from which liquid passes out through the tube 26 arranged at the bottom thereof.

The apparatus works as follows:—

When the apparatus is turning at the required speed and in normal work liquid to be clarified is regularly and continuously admitted through the tube 15, the distributor 14 and nozzles 16 into the casing 17; under the influence of centrifugal force the liquid tends to pass to the periphery of the casing and to come into the apparatus through the pipe 18 and the perforated tubes 19.

On passing out of the tube 19 the molecules of cloudy liquid are subjected to the centrifugal force which obtains in this zone and, under this influence, the solid particles are drawn towards the periphery of the apparatus together with a certain quantity of the original liquid. In other words the mass which reaches the periphery is enriched in solid matter while clarified liquid tends to come to the centre; for as the quantity of liquid led to the pipe 15 is larger than that which can pass out through all the nozzles 11, a certain quantity of liquid must continuously pass out of the apparatus through the orifices 20 near to the centre. Such liquid which has been forced to travel from the distribution pipes 19 to the level of the tube 24 is, as has previously been stated, the clarified liquid.

After having traversed the apertures 20 clear liquid is led by the pipe 21 into the collector 22 from which it passes out through the tube 23.

Thick liquid brought by centrifugal force towards the vertex 8 of each pyramid owing to the faces of the solids over which it is obliged to pass flows continuously outwards through the pipes 10 and nozzles 11 and is received into the collector 25 from which it flows away through the tube 26.

Just as the inlet of liquid to be clarified takes place continuously owing to the difference between the level 27 and that of the tube 24, so the outlet of the thickened liquid through the pipes 9 and 10 and the nozzles 11 is caused by the differences of level between the tube 24 and the nozzles 11.

Referring to Figure 3 in which water or other liquid is introduced into the apparatus the axle 3 is for a portion of its length provided with a bore 29 while 28 is a gland. Water for example is then led to the centre of the apparatus through the bore 29 and from thence into distributors 31 located at the base of the cones or pyramids 7 by a series of pipes 30.

The distributors 31 distribute water into the mass of liquid where the separating action caused by the centrifugal force is greatest in the cylindrical portion of the apparatus.

The added water being lighter than the solids passes as shown by the arrows F towards the centre of the apparatus while the solids as shown by the arrows $f^2$ pass towards the periphery of the apparatus. There will therefore be a systematic continuous counter current circulation of the solids and the water.

The solids passing into the cones 7 will no longer be mixed with the initial liquid to be purified but only with the diluent always supposing that the outlet for the liquid containing the solids is suitable. It may even be possible to add large quantities of water without prejudicing the density of the clear liquid obtained.

What I claim is:—

1. A continuous rotary apparatus for clarifying liquids comprising a central container, a series of tapering chambers forming continuations of the container, means located near to the axis of the apparatus for the outlet of clarified liquid from the container, means for the outlet of enriched liquid at the ends of the tapering chambers, means for the inlet of liquid located intermediate of the outlet for clarified liquid and the outlets for enriched liquid, the inlet means to the container and the outlet means from the tapering chambers being adapted to allow the inlet of more liquid to the container than can pass out from the tapering chambers.

2. A continuous rotary apparatus for clarifying liquids comprising a central container, a series of tapering chambers forming continuations of the container each provided with a constricted orifice, outlets for clarified liquid located near the axis of the apparatus, a perforated tube located further from the axis of the apparatus than the outlets for clarified liquid and outwardly perforated inlet tubes located near to the bases of the tapering chambers.

3. A continuous rotary apparatus for clarifying liquids comprising a central container, a series of tapering chambers forming continuations of the container, pipes leading from the ends of such tapering chambers which are bent inwards towards the axis of the apparatus and terminate in portions parallel with such axis, outlets for the clarified liquid arranged near to the axis of the apparatus, and inlet to the central container located near to the bases of the tapering chambers.

4. A continuous rotary apparatus for clarifying liquid comprising a central container, a series of tapering chambers forming continuations of the container, a stationary circular distributor on one side of the apparatus for the liquid to be clarified, a series of outlet pipes from the distributor, a rotary casing surrounding said pipes, a series of pipes from said container leading liquid near to the bases of said tapering chambers, outlets from the central container located near to the axis of the apparatus, a fixed circular collector surrounding the said outlets and arranged on the other side of the apparatus to the said distributor, a fixed circular collector concentric with the other said collector, and pipes leading from the ends of the tapering chambers into the second said collector.

5. A continuous rotary apparatus for clarifying liquids comprising a central container, a series of tapering chambers forming continuations of the container, means located near to the axis of the apparatus for the outlet of clarified liquid from the container, means for the outlet of enriched liquid at the ends of the tapering chambers, means for the inlet of liquid located intermediate of the outlet for clarified liquid and the outlets for enriched liquid, the inlet means to the container and the outlet means from the tapering chambers being adapted to allow the inlet of more liquid to the container than can pass out from the tapering chambers, and means for leading a diluent into the apparatus.

6. A continuous rotary apparatus for clarifying liquids comprising a central container, a series of tapering chambers forming continuations of the container, means located near to the axis of the apparatus for the outlet of clarified liquid from the container, means for the outlet of enriched liquid at the ends of the tapering chambers, means for the inlet of liquid located intermediate of the outlet for clarified liquid and the outlets for enriched liquid, the inlet means to the container and the outlet means from the tapering chambers being adapted to allow the inlet of more liquid to the container than can pass out from the tapering chambers, and means for leading a diluent to the base of each tapering chamber.

7. A continuous rotary apparatus for clarifying liquids comprising a central container, a series of tapering chambers forming continuations of the container each provided with a constricted orifice, outlets for clarified liquid located near the axis of the apparatus, a perforated tube located further from the axis of the apparatus than the outlets for clarified liquid, outwardly perforated inlet tubes located near to the bases of the tapering chambers and means for leading a diluent into distributors located near to the base of each tapering chamber.

8. A continuous rotary apparatus for clarifying liquids comprising an axle hollow for a portion of its length, a central container, a series of tapering chambers forming continuations of the container, means located near to the axis of the apparatus for the outlet of clarified liquid from the container, means for the outlet of enriched liquid at the ends of the tapering chambers, means for the inlet of liquid located intermediate of the outlet for clarified liquid and the outlets for enriched liquid, the inlet means to the container and the outlet means from the tapering chambers being adapted to allow the inlet of more liquid to the container than can pass out from the tapering chambers, means for leading a diluent into the hollow axle, a distributor located near to the base of each tapering chamber and pipes connecting each distributor with the hollow portion of the axle.

9. A continuous rotary apparatus for clarifying liquids comprising an axle hollow for a portion of its length, a central container, a series of tapering chambers forming continuations of the container, a stationary circular distributor on one side of the apparatus for the liquid to be clarified, a series of outlet pipes from the distributor, a rotary casing surrounding said pipes, a series of pipes from said container leading liquid near to the bases of said tapering chambers, outlets from the central container located near to the axis of the apparatus, a fixed circular collector surrounding the said outlets and arranged on the other side of the apparatus to the said distributor, a fixed circular collector concentric with the other said collector, pipes leading from the ends of the tapering chambers into the second said collector, means for leading a diluent into the hollow axis, a distributor located near to the base of each tapering chamber and pipes connecting each distributor with the hollow portion of the axle.

In testimony whereof I affix my signature.

CHARLES BOUILLON.